(12) United States Patent
Hu

(10) Patent No.: US 9,691,422 B1
(45) Date of Patent: Jun. 27, 2017

(54) SLIDER AIR-BEARING SURFACE DESIGNS WITH EFFICIENCY-FLATTENING HOLE

(71) Applicant: Western Digital Technologies, Inc., Irvine, CA (US)

(72) Inventor: Yong Hu, San Ramon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/335,631

(22) Filed: Oct. 27, 2016

(51) Int. Cl.
*G11B 5/60* (2006.01)

(52) U.S. Cl.
CPC .......... *G11B 5/6082* (2013.01); *G11B 5/6005* (2013.01)

(58) Field of Classification Search
CPC .............................. G11B 5/6005; G11B 5/6082
USPC ...................... 360/235.7, 235.8, 236.5, 236.6
See application file for complete search history.

(56) References Cited

U.S. PATENT DOCUMENTS

| | | | |
|---|---|---|---|
| 5,704,715 A | 1/1998 | Chang et al. | |
| 6,115,329 A | 9/2000 | Hu | |
| 7,009,813 B2 | 3/2006 | Kang et al. | |
| 7,289,299 B1 | 10/2007 | Sun et al. | |
| 7,719,785 B2 | 5/2010 | Taniguchi et al. | |
| 8,493,688 B2 | 7/2013 | Ambekar et al. | |
| 8,649,126 B2 | 2/2014 | Bolasna et al. | |
| 8,681,455 B2 | 3/2014 | Reddy et al. | |
| 8,767,339 B2 | 7/2014 | Zeng et al. | |
| 8,810,968 B2 * | 8/2014 | Rajasekharan | G11B 5/6082 360/235.7 |
| 8,867,172 B2 * | 10/2014 | Zheng | G11B 5/607 360/235.7 |
| 9,001,468 B2 * | 4/2015 | Krolnik, II | G11B 5/6082 360/236.5 |
| 9,082,441 B1 | 7/2015 | Hu et al. | |
| 9,165,579 B1 | 10/2015 | Zhang | |
| 9,230,587 B1 | 1/2016 | Hu et al. | |
| 9,401,169 B1 | 7/2016 | Canchi et al. | |
| 2003/0058578 A1 * | 3/2003 | Boutaghou | G11B 5/6005 360/235.8 |
| 2005/0231851 A1 * | 10/2005 | Yoshida | G11B 5/1871 360/235.2 |

(Continued)

OTHER PUBLICATIONS

D.S. Chhabra et al., "Air Bearing Design Considerations for Constant Fly Height Applications," IEEE Transactions on Magnetics, vol. 30, Issue 2, Mar. 1994, pp. 417-423.

(Continued)

*Primary Examiner* — Jefferson Evans
(74) *Attorney, Agent, or Firm* — Jacobsen IP Law; Krista S. Jacobsen

(57) ABSTRACT

Disclosed herein are hard disk drive sliders having an air-bearing surface (ABS) with an efficiency-flattening hole (EFH). The sliders comprise a trailing edge pad that has a first surface at a first level with a first perimeter, a second surface at a second level, the second level being below the first level, the second surface being substantially parallel to the first surface, the second surface having a second perimeter, wherein the second perimeter is within the first perimeter, and a third surface at a third level, the third level being below the second level, the third surface being substantially parallel to the first and second surfaces, the third surface having a third perimeter, wherein the third perimeter is within the second perimeter.

20 Claims, 11 Drawing Sheets

(56) References Cited

U.S. PATENT DOCUMENTS

| | | | |
|---|---|---|---|
| 2011/0026164 A1* | 2/2011 | Bolasna | G11B 5/6005 360/236.6 |
| 2012/0134055 A1* | 5/2012 | Tsuda | G11B 5/6082 360/235.6 |
| 2015/0015989 A1* | 1/2015 | Sytine | G11B 5/6005 360/75 |

OTHER PUBLICATIONS

Hong Zhu, "Global optimization of slider air bearing design," Dissertation, University of California at Berkeley, 2002.
Hong Zhu, et al., "DIRECT algorithm and its application to slider air-bearing surface optimization," IEEE Transactions on Magnetics, vol. 38, Issue 5, Sep. 2002, pp. 2168-2170.

* cited by examiner

SLIDER AIR-BEARING SURFACE DESIGNS WITH EFFICIENCY-FLATTENING HOLE

BACKGROUND

Magnetic storage systems, such as hard disk drives, are used to store large amounts of information. A magnetic head in a magnetic storage system typically includes a read/write transducer for retrieving and storing magnetically encoded information on a magnetic recording medium, such as a disk. A suspended slider supports the magnetic head. The slider provides mechanical support for the magnetic head and the electrical connections between the magnetic head and the rest of the magnetic storage system.

During operation, the slider floats a small distance above the magnetic recording medium (i.e., the hard disk), which rotates at high speeds. Components of a disk drive move the slider and, therefore, the magnetic head to a desired radial position over the surface of the rotating disk, and the magnetic head reads or writes information. The slider rides on a cushion or bearing of air created above the surface of the disk as the disk rotates at its operating speed. The slider has an air-bearing surface (ABS) that faces the disk. The ABS is designed to generate an air-bearing force that counteracts a preload bias that pushes the slider toward the disk. The ABS causes the slider to fly above and out of contact with the disk.

There is an ongoing need for slider designs that improve performance of magnetic storage systems.

SUMMARY

Disclosed herein are novel slider designs that include an efficiency flattening hole (EFH) that improves the performance of magnetic storage systems and hard disk drives incorporating such novel sliders. Also disclosed are hard disk drives including such novel sliders.

In some embodiments, a slider comprises a leading edge surface, a trailing edge surface opposite the leading edge surface, a first side edge surface extending between the leading edge surface and the trailing edge surface, a second side edge surface opposite the first side edge surface and extending between the leading edge surface and the trailing edge surface, and a trailing edge pad. The trailing edge pad comprises a first surface at a first level, the first surface being substantially perpendicular to the leading edge surface, the trailing edge surface, the first side edge surface, and the second side edge surface, the first surface having a first perimeter; a second surface at a second level, the second level being below the first level, the second surface being substantially parallel to the first surface, the second surface having a second perimeter, wherein the second perimeter is within the first perimeter; and a third surface at a third level, the third level being below the second level, the third surface being substantially parallel to the first and second surfaces, the third surface having a third perimeter, wherein the third perimeter is within the second perimeter.

In some embodiments, the second level is between approximately 100 nm and 200 nm below the first level, and the third level is between approximately 300 nm and 2000 nm below the second level.

In some embodiments, a portion of the third perimeter is parallel to a portion of the second perimeter. In some embodiments, the second perimeter and/or the third perimeter includes a protrusion. The protrusion, which may be an arc or a finger-type feature, may be in a direction toward the leading edge surface.

In some embodiments, the slider also has first and second arms connected to and extending from the trailing edge pad toward the leading edge surface, and the first and second arms form a channel.

In some embodiments, a length of the third surface in a direction from the first side edge surface to the second side edge surface is greater than a length of the third surface in a direction from the leading edge surface to the trailing edge surface. In some such embodiments, the length of the third surface in the direction from the first side edge surface to the second side edge surface is at least twice the length of the third surface in the direction from the leading edge surface to the trailing edge surface.

In some embodiments, the slider includes a magnetic read/write head.

BRIEF DESCRIPTION OF THE DRAWINGS

The disclosure herein is illustrated by way of example, and not by way of limitation, in the figures of the accompanying drawings, in which like reference numerals refer to similar elements and in which.

DETAILED DESCRIPTION

The following description is made for the purpose of illustrating the general principles of the present disclosure and is not meant to limit the inventive concepts claimed herein. Furthermore, particular embodiments described herein may be used in combination with other described embodiments in various possible combinations and permutations.

Figure 1:
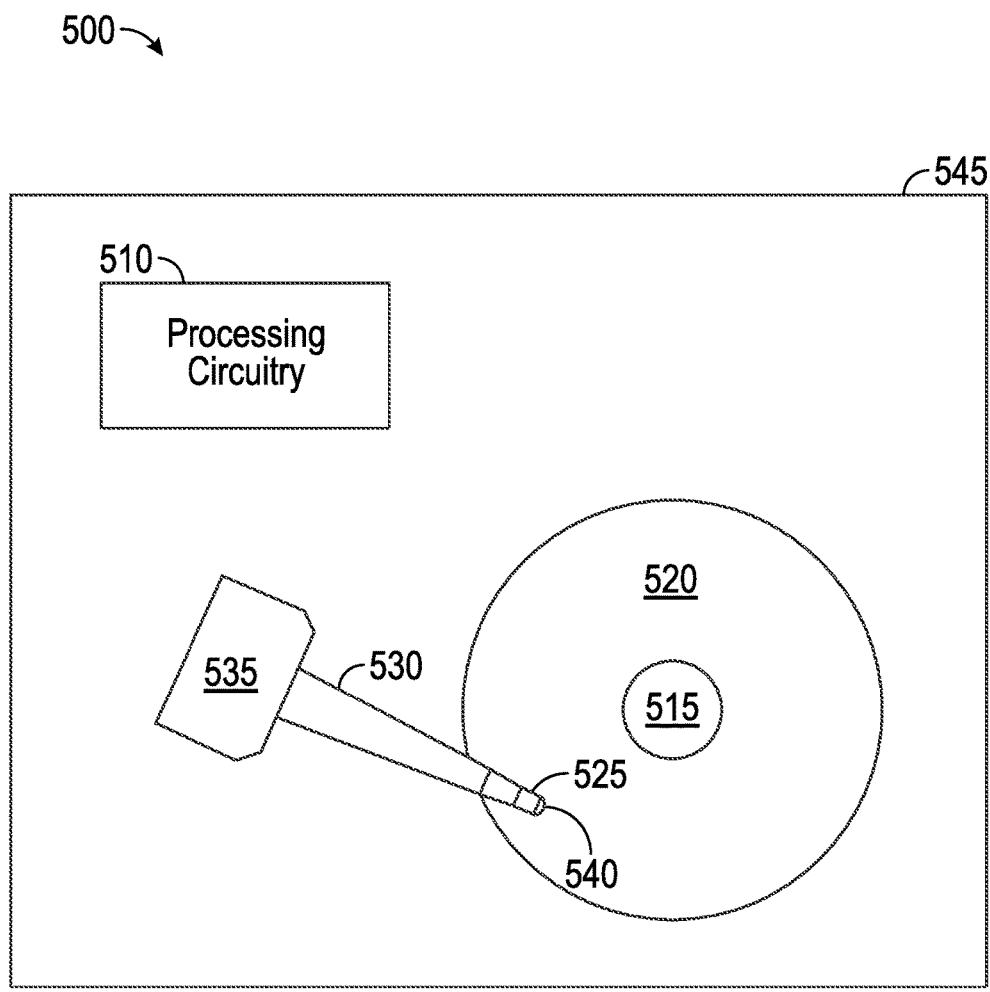
FIG. 1 illustrates several components of an exemplary hard disk drive in accordance with some embodiments.

FIG. 1 illustrates several components of an exemplary hard disk drive 500 in accordance with some embodiments. The magnetic hard disk drive 500 includes a spindle 515 that supports and rotates a magnetic disk 520. The spindle 515 is rotated by a spindle motor (not shown) that is controlled by a motor controller (not shown) that may be implemented in electronics of the hard disk drive 500. A slider 525, which is supported by a suspension and actuator arm 530, has a combined read and write magnetic head 540. The head 540 may include only one read sensor, or it may include multiple read sensors. The read sensors in the head 540 may include, for example, one or more giant magnetoresistance (GMR) sensors, tunneling magnetoresistance (TMR) sensors, or another type of magnetoresistive sensor. An actuator 535 rotatably positions the suspension and actuator arm 530 over the magnetic disk 520. The components of the hard disk drive 500 may be mounted on a housing 545. It is to be understood that although FIG. 1 illustrates a single disk 520, a single slider 525, a single head 540, and a single suspension and actuator arm 530, hard disk drive 500 may include a plurality (i.e., more than one) of disks 520, sliders 525, heads 540, and suspension and actuator arms 530.

In operation, the actuator 535 moves the suspension and actuator arm 530 to position the slider 525 so that the magnetic head 540 is in a transducing relationship with the surface of the magnetic disk 520. When the spindle motor rotates the disk 520, the slider 525 is supported on a thin cushion of air known as the air bearing that exists between the surface of the disk 520 and an air-bearing surface of the slider 525. The head 540 may be used to write information to multiple tracks on the surface of the disk 520 and to read previously-recorded information from the tracks on the surface of the disk 520. Processing circuitry 510 provides to the head 540 signals representing information to be written to the disk 520 and receives from the head 540 signals representing information read from the disk 520. The processing circuitry 510 also provides signals to the spindle motor to rotate the magnetic disk 520, and to the actuator 535 to move the slider 525 to various tracks.

To read information from the magnetic disk 520, the slider 525 passes over a region of the disk 520, and the head 540 detects changes in resistance due to magnetic field variations recorded on the disk 520, which represent the recorded bits.

The slider 525 has a gas-bearing surface that faces the surface of the disk 520 and counteracts a preload bias that pushes the slider toward the disk 520. For convenience, in this document the gas-bearing surface is referred to as the air-bearing surface (ABS) and the gas is generally referred to as "air," although it is to be understood that the gas used in a hard disk drive 500 may be a gas other than air (e.g., the gas may be helium). For simplicity, throughout this disclosure, the surface of the slider 525 that faces or that will eventually face the disk 520 is referred to as the ABS.

As the disk 520 rotates, the disk 520 drags air under the slider 525 and along the ABS in a direction approximately parallel to the tangential velocity of the disk 520. As the air passes under the ABS, air compression along the air flow path causes the air pressure between the disk 520 and the ABS to increase, which creates a hydrodynamic lifting force that counteracts the tendency of the suspension and actuator arm 530 to push the slider 525 toward the disk 520. The slider 525 thus flies above the disk 520 but in close proximity to the surface of the disk 520. To obtain good performance, it is desirable for the slider 525 to maintain a substantially constant flying height above the surface of the disk 520. The degree of stability of the fly-height of the slider influences the performance of the magnetic head 540. The design of the slider 525 ABS has an impact on the flying characteristics of the slider 525 and therefore the performance of the magnetic head 540.

Figure 2:
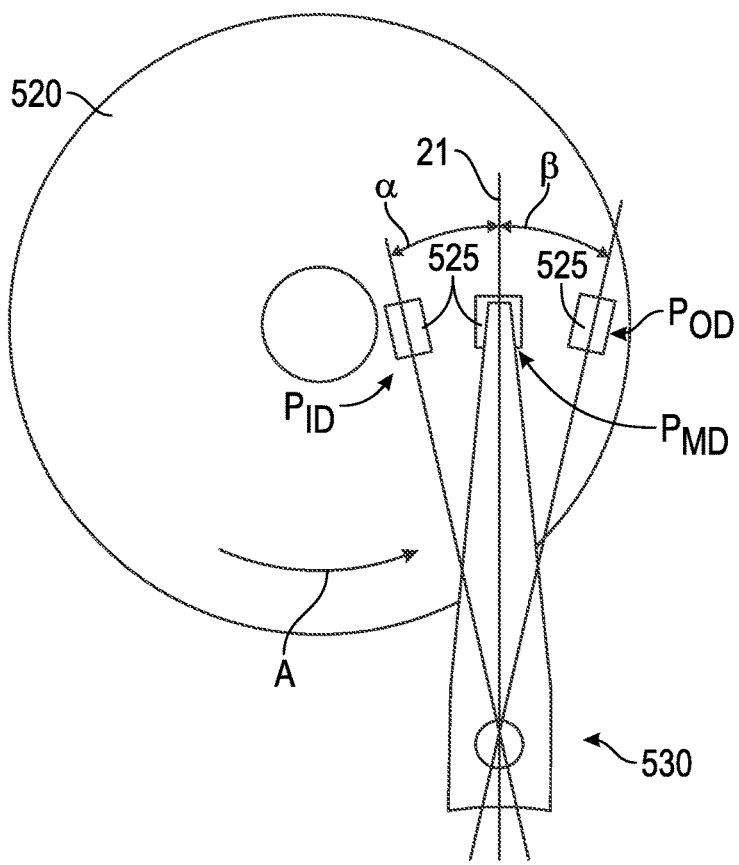
FIG. 2 is a diagram showing skew angles of a slider at different positions with respect to a magnetic disk.

FIG. 2 is a diagram showing skew angles of the slider 525 at different positions with respect to the magnetic disk 520. The suspension and actuator arm 530 supports the slider 525 above the surface of the magnetic disk 520 at locations including an inner diameter (ID) position $P_{ID}$, an outer diameter (OD) position $P_{OD}$, and positions between $P_{ID}$ and $P_{OD}$, including the mid-disk (MD) position $P_{MD}$. As the disk 520 spins, it produces airflow in a direction tangential to the disk 520 in the direction the disk 520 spins, as shown by the arrow A. When the slider 525 is at the mid-disk position $P_{MD}$, the centerline 21 of the slider 525 is approximately aligned with the direction of the airflow produced by the disk 520, and therefore the skew angle is 0 (zero). When the slider 525 is at other positions over the disk 520, however, the centerline 21 of the slider 525 is not aligned with the direction of the airflow produced by the disk 520. The angle of misalignment of the direction of the airflow and the centerline 21 of the slider 525 is known as the skew angle. The skew angle affects the aerodynamic characteristics of the slider ABS. Generally, the greater the skew angle, the lower the lift produced for a given airflow velocity. As shown in FIG. 2, when the slider 525 is at the ID position $P_{ID}$, the skew angle is α, which is the maximum skew angle in the ID direction. When the slider 525 is at the OD position $P_{OD}$, the skew angle is β, which is the maximum skew angle in the OD direction.

The airflow velocity produced by the spinning disk 520 is dependent on the distance between the slider 525 and the center of the disk 520. At slider 525 fly heights, the tangential airflow produced by the disk 520 is close to the tangential velocity of the disk 520. This tangential velocity is equal to (RPM)×2πR, where RPM is the number of rotations per minute of the disk 520, and R is the distance from the location of the slider 525 to the center of the disk 520. As a result of the skew angle's effect on lift and the variation in tangential airflow depending on the position of the slider 525 above the disk 520 surface, the slider 525 tends to fly at its highest level above the disk at the mid-disk position $P_{MD}$ and progressively lower toward the ID and OD to minimum fly-height levels at the ID position $P_{ID}$ and the OD position $P_{OD}$. This phenomenon is known as mid-disk (MD) hump.

Embodiments disclosed herein relate to the control of a slider's fly height over a disk in a hard disk drive. Prior art head slider designs can suffer from drawbacks that negatively affect the fly height of a slider and/or the stability of the slider's fly height. These drawbacks can include lubricant pick-up; high peak pressure between the slider and the disk, which increases lubricant pick-up and affects the ability to efficiently compensate for fly-height variations; MD hump, described above; and insufficient stiffness of the slider. Lubricant pickup occurs when lubricant coated on the disk collects on the slider. Once collected on the slider, the lubricant tends to interfere with the fly height, which results in poor magnetic interfacing between the slider and the disk. In addition, the high peak pressure associated with air pressure between the slider and the disk may contribute to lubricant pickup. As the peak pressure increases, the ability to compensate (and the efficiency of any compensation) for the fly height of the magnetic head decreases.

As described above, MD hump arises when the slider's fly height changes depending on where over the disk the slider flies and peaks near or at MD. If the slider has insufficient stiffness, it may flex and distort during operation of the hard disk drive. Distortion of the slider may affect the distance between the read/write head and the disk, which can result in poor magnetic interfacing between the head and the disk. Severe distortion may lead to more catastrophic failures caused by contact between portions of the slider and the disk.

Some modern disk drives use a slider equipped with a heater that heats the portion of the slider on which the read/write head is mounted to reduce the distance between the head and the disk as the slider flies over the disk. A thermal fly-height control (TFC) supplies the heater with electric current to generate heat that causes the portion of the slider on which the head is mounted to protrude by thermal expansion, which leads to decreased clearance between the magnetic disk and the head element.

Touchdown measurement enables estimation of the clearance between the head element and the disk in hard disk drives that use TFC. The power required to cause the thermal protrusion to contact the disk is the touchdown power (TDP). Once the TDP is determined, the power supplied by the TFC can be backed off from the TDP level to obtain a desired clearance between the head element and the disk. The TFC efficiency, which has units of distance/power (e.g., nm/mW), is a measure of the amount of power that must be applied by the TFC to cause a specified protrusion distance. The pull-back (PB) efficiency, which also has units of distance/power (e.g., nm/mW), is a measure of the amount by which the power supplied by the TFC must be backed off to achieve a desired spacing between the disk and the head element protrusion. By measuring the TDP as the slider flies over different portions of the disk (i.e., at different distances from the center of the disk, such as ID, MD, and OD), a TDP profile may be generated to plot the TDP versus disk radius. Similarly, by determining the TFC efficiency (or PB efficiency) at different slider positions over the disk, a TFC efficiency profile (or PB efficiency profile) may be determined.

Figure 3:
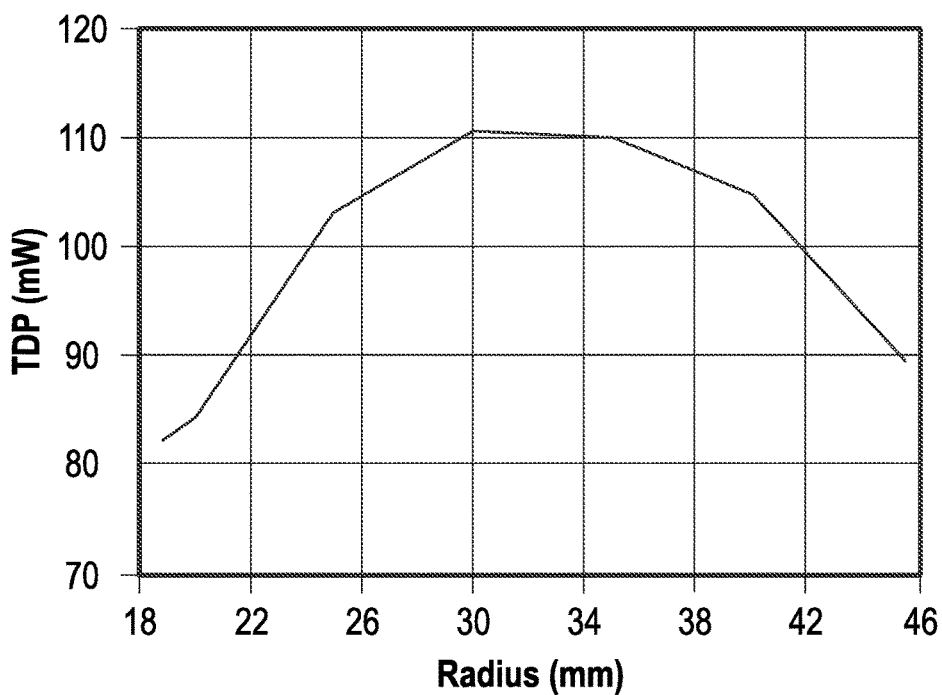
FIG. 3 illustrates an exemplary touch-down power (TDP) profile for a slider that has a finger-type feature.

As explained above, MD hump is directly caused by a slider flying higher (i.e., further away from the disk surface) when the slider flies over the middle of the disk than when it flies over the ID or OD. The MD hump is reflected in plots of the TDP profile as a TDP hump. FIG. 3 illustrates an exemplary TDP profile for a slider that has a "finger-type" feature described below in the context of FIG. 5. As evident from FIG. 3, the TDP peaks at around MD (at a power level over 110 mW approximately 30 mm from the disk center) and is lower at both ID (around 80 mW approximately 18 mm from the disk center) and OD (around 90 mW approximately 46 mm from the disk center). Thus, FIG. 3 illustrates that, relative to the amount of power required at ID and OD, more power is required near MD to cause the thermal protrusion to contact the disk, which confirms that the slider (in this case, with a finger-type feature) flies further away from the disk at MD locations than at locations closer to ID or OD.

To improve the recording density of a magnetic disk, it is desirable to decrease the distance between the magnetic head and the magnetic disk while the slider flies over the disk. Because MD hump results in the slider flying higher over the disk when at locations closer to MD than at locations closer to ID or OD, it is desirable to mitigate MD hump in order to provide a more uniform distance between the magnetic head and the disk. Stated another way, it is desirable to flatten the TDP profile so that the TDP is approximately the same regardless of where over the disk the slider flies. A flatter TDP profile results in several possible benefits, including areal density capacity (ADC) gain (because the maximum fly-height of the slider is lower when the TDP profile is flatter), mitigation of plastic deformation (because of less TFC power needed for the same amount of protrusion), and the ability to use a simpler hard disk drive spacing algorithm (because the fly-height is less dependent on where over the disk the slider flies).

Figure 4:
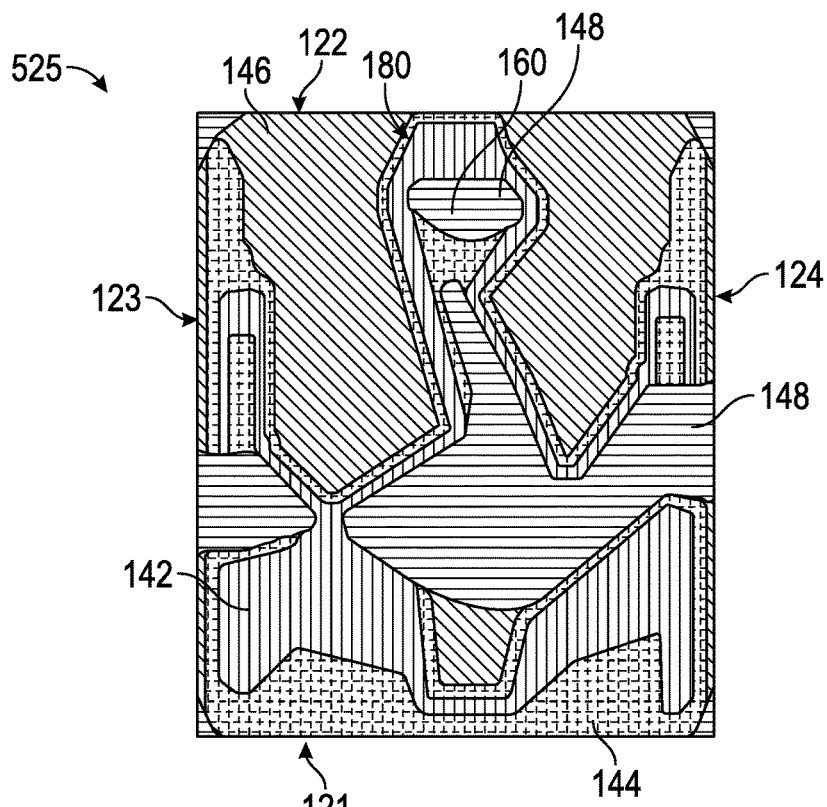
FIG. 4 is an ABS view of a slider with a deep recess near a trailing-edge pad.

Previous attempts to flatten the TDP profile include the approach disclosed in U.S. Pat. No. 8,649,126. This approach uses reactive ion etching (RIE) to create a deep recess in front of a pad near the trailing edge of the slider. FIG. 4 is an ABS view of a slider 525 that has a leading edge surface 121, a trailing edge surface 122, a first side edge 123, a second side edge 124, and an ABS with four levels. The first level 142 is the level that will be closest to the disk 520 when the slider 525 is installed in a disk drive 500. In this document, the first level 142 is referred to as the "highest" level of the ABS. The second level 144 is the next-highest level (i.e., the level that is next closest to the surface of the disk 520 when the slider 525 is installed in a disk drive 500). The third level 146 is the next-highest level, and the fourth level 148 is the lowest level (i.e., the level that is furthest from the surface of the disk 520 when the slider 525 is installed in a disk drive 500). The slider 525 also includes a trailing edge pad 180 that has a read/write head (not shown) mounted on it close to the trailing edge 122 of the slider 525. The slider 525 also has a deep recess 160, created using RIE, near the trailing edge pad 180. The deep recess 160 flattens the TDP profile but can result in a long TFC constant (i.e., can cause a re-coil effect), high crown sensitivity, and a risk of reliability issues ("fencing") caused by the RIE process if the deep recess 160 is positioned over the trailing edge air bearing surface of the slider 525. Moreover, the RIE process used to create deep recesses is being phased out in the hard disk drive industry.

Figure 5:
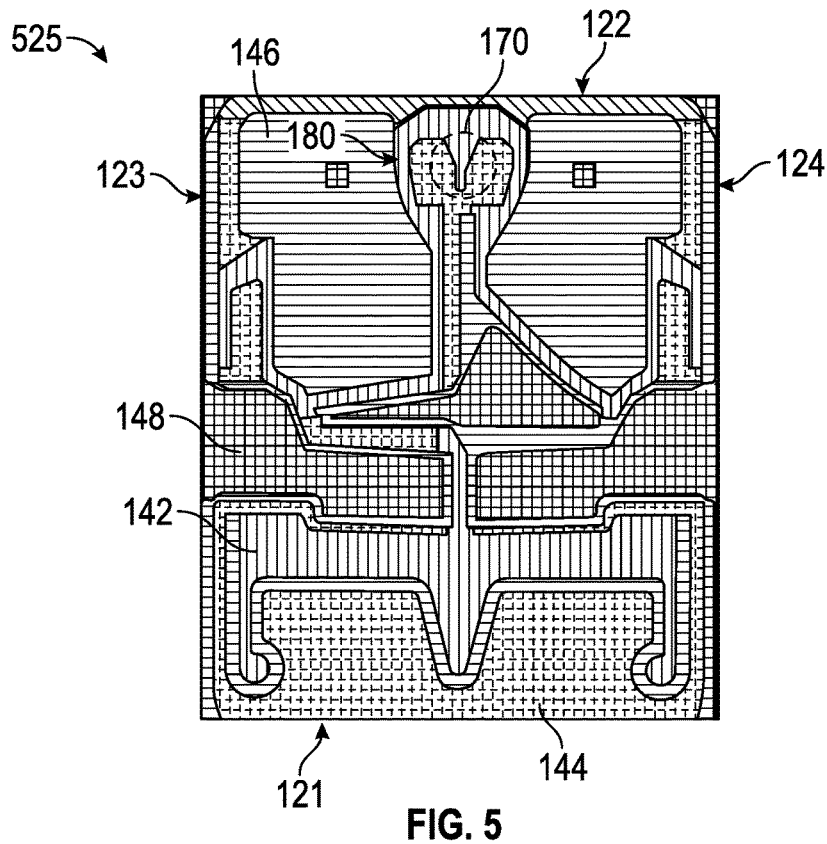
FIG. 5 is an ABS view of a slider with a finger-type feature in a trailing-edge pad.
Figure 6:
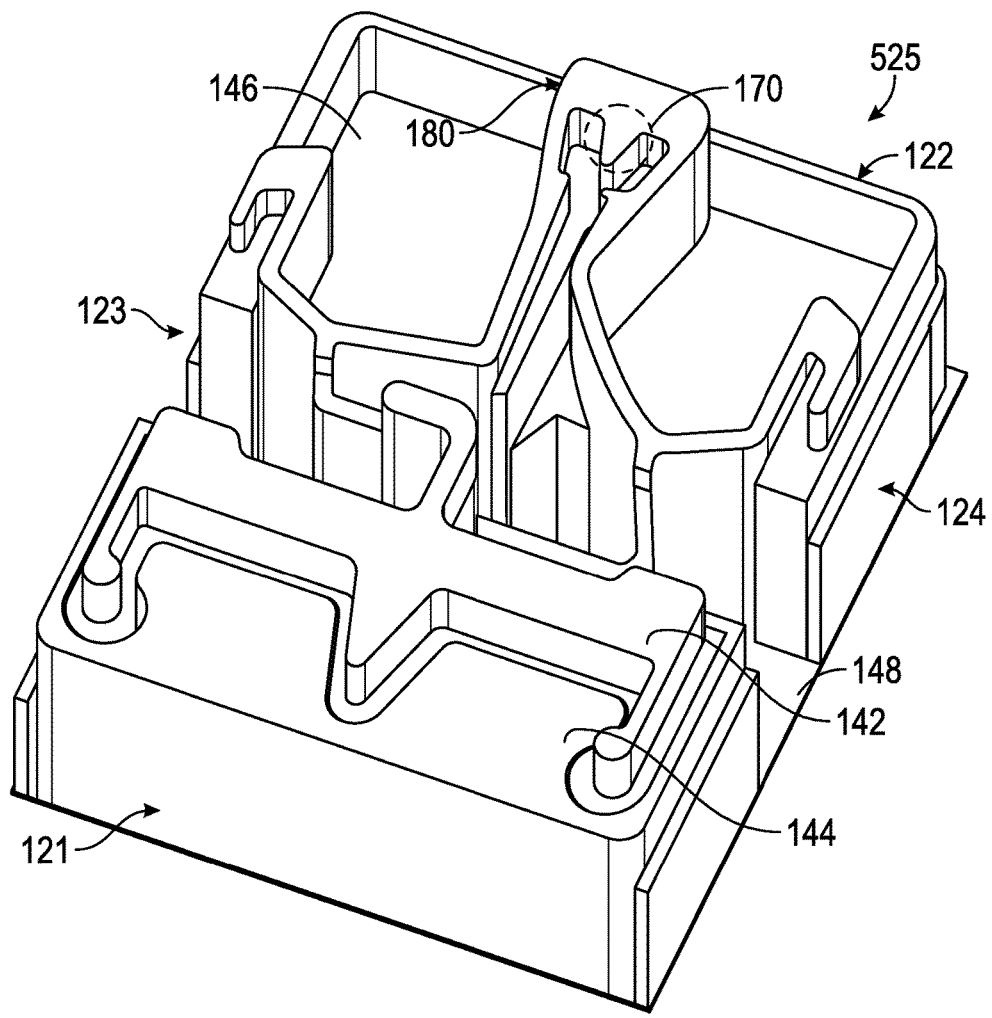
FIG. 6 is a three-dimensional view of the slider shown in FIG. 5.

Another approach to mitigate MD hump is to include a "finger-type" of feature in a pad near the trailing edge of the slider. FIG. 5 is an ABS view of a slider 525 that, like the slider 525 illustrated in FIG. 4, has a leading edge surface 121, a trailing edge surface 122, a first side edge 123, a second side edge 124, and an ABS with four levels 142, 144, 146, and 148. FIG. 6 is a three-dimensional view of the slider 525 shown in FIG. 5. In FIGS. 5 and 6, the relationships among the levels 142, 144, 146, and 148, and between the levels 142, 144, 146, and 148 and the disk 520, are the same as described above for FIG. 4. Like the slider 525 of FIG. 4, the slider 525 of FIGS. 5 and 6 includes a trailing edge pad 180 that has a read/write head (not shown) mounted on it. Unlike the slider 525 of FIG. 4, however, the slider 525 of FIGS. 5 and 6 does not have a deep recess near the trailing edge pad 180. Instead, the slider 525 of FIGS. 5 and 6 has a finger-type feature 170 created in the trailing edge pad 180. The finger-type feature 170 is so named because it is longer in the direction from the leading edge surface 121 to the trailing edge surface 122 (i.e., in the down-track direction) than in the direction from the first side edge 123 to the second side edge 124 (i.e., in the cross-track direction). The finger-type feature 170 may be created using shallow ion milling (SIM), which may reduce the risk of fencing that is inherent in RIE and, as discussed above, potentially causes reliability issues with the deep recess approach described above in the context of FIG. 4.

Whereas the finger-type feature 170 shown in FIGS. 5 and 6 may produce a slider 525 having a short TFC time constant (i.e., causing minimal re-coil effect) and low crown sensitivity, the TDP profile of a slider 525 with a finger-type feature 170 is not substantially flat as shown by FIG. 3, and there can be a significant writer spacing loss at mid-disk. Thus, the need remains for slider designs that provide the benefits of sliders 525 that have finger-type features 170 while also flattening the TDP profile.

Disclosed herein are slider embodiments with an efficiency-flattening hole (EFH) in the trailing-edge pad of a slider. As the slider flies over the disk, the EFH stores air and re-directs it onto the protruding head element in a substantially uniform way that is largely independent of the slider's location over the disk (i.e., the airflow is approximately consistent regardless of whether the slider flies at ID, MD, or OD). The EFH is narrow in the down-track direction and has a shallow ion milled (SIM) step between the deepest level of the EFH and the surface of the ABS that is closest to the disk when the slider flies over the disk. Simulations and experiments demonstrate that the EFH can provide a nearly flat TDP profile (e.g., ~1 mW TDP hump, representing an approximately 94% improvement over prior-art designs), a very uniform PB efficiency profile, low crown sensitivity, and minimal re-coil effect (i.e., a short TFC time constant). Tests conducted to assess the effectiveness of the embodiments disclosed herein indicate that at the MD, the writer spacing can be lowered by TDP hump reduction achieved by the EFH. In some embodiments, plastic deformation is reduced by TDP hump improvement. Moreover, the EFH may be created using conventional fabrication processes (e.g., by etching using ion milling) with no fencing risk.

Figure 7:
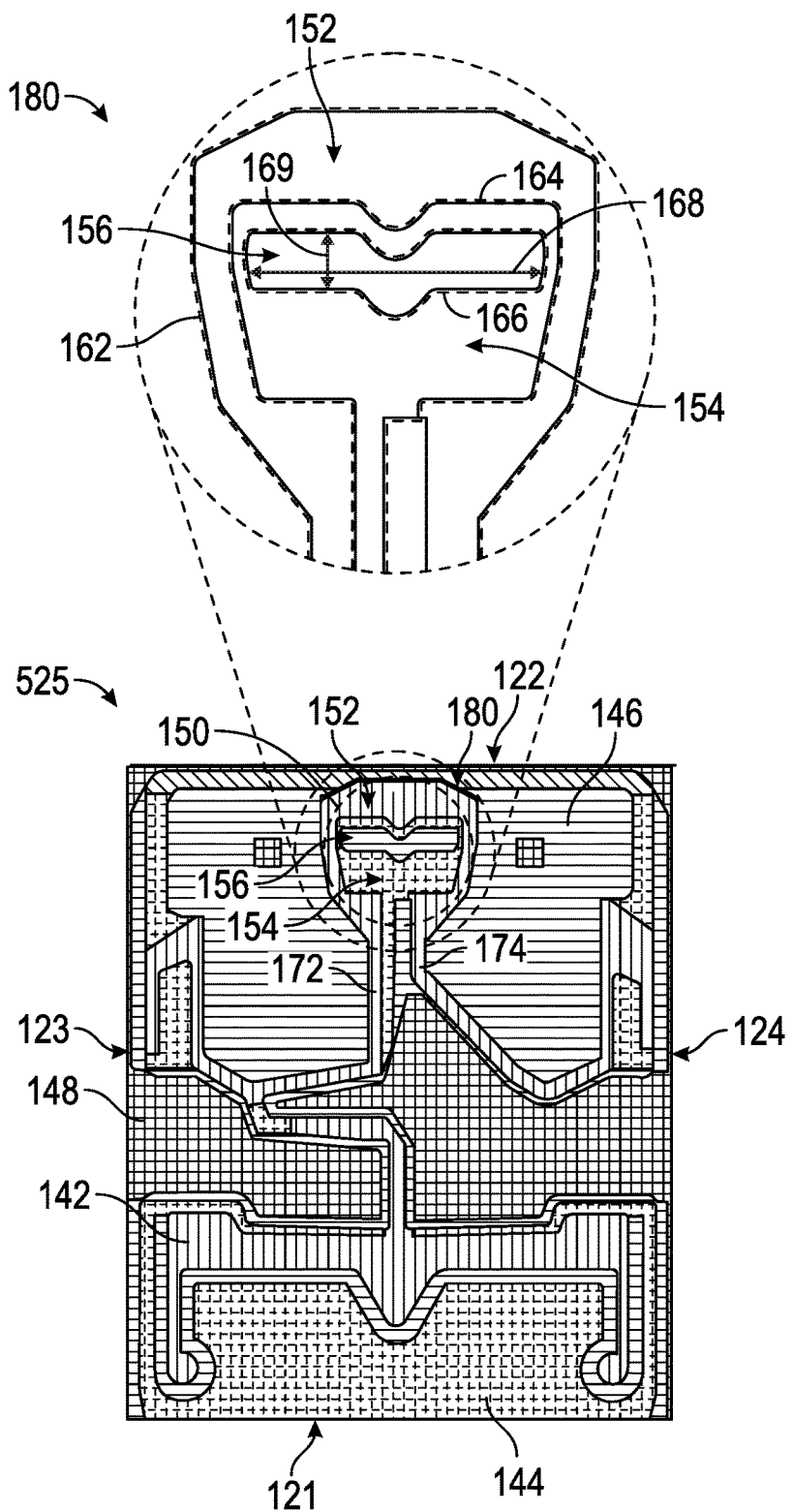
FIG. 7 is an ABS view of an exemplary slider with an efficiency-flattening hole (EFH) in the trailing-edge pad in accordance with some embodiments.
Figure 8:
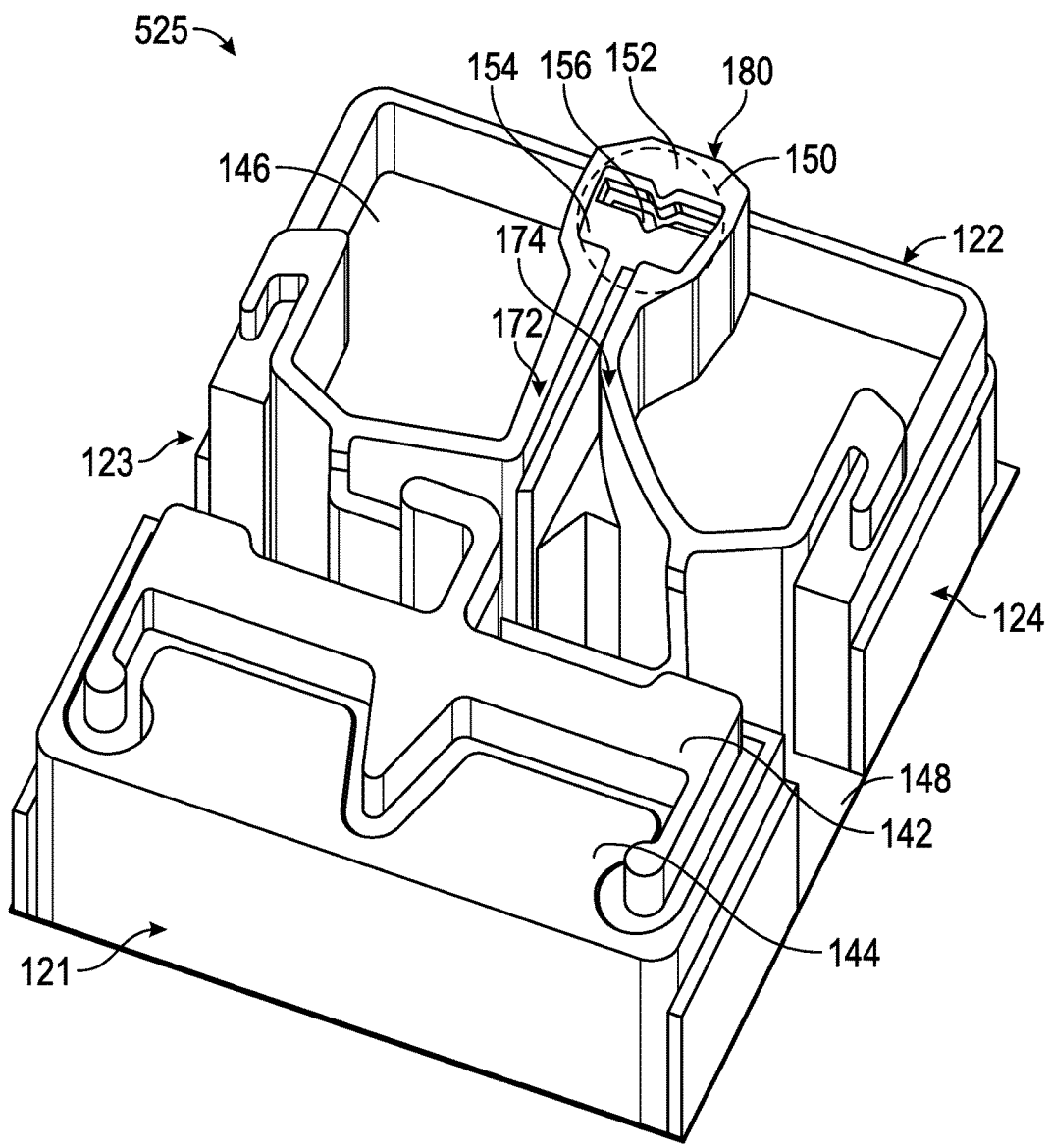
FIG. 8 is a three-dimensional view of the exemplary slider shown in FIG. 7.

FIG. 7 is an ABS view of an exemplary slider 525 with an EFH 150 in the trailing-edge pad 180 in accordance with some embodiments. FIG. 8 is a three-dimensional view of the slider 525 shown in FIG. 7. The slider 525 of FIGS. 7 and 8 has a leading edge surface 121, a trailing edge surface 122 opposite the leading edge surface 121, a first side edge surface 123 extending between the leading edge surface 121 and the trailing edge surface 122, and a second side edge surface 124 opposite the first side edge surface 123 and extending between the leading edge surface 121 and the trailing edge surface 122. In addition, the slider 525 includes features at four levels 142, 144, 146, and 148.

Referring to both FIGS. 7 and 8, the slider 525 includes a trailing-edge pad 180, which has a first surface 152 at a first level 142. The first surface 152 is substantially perpendicular to the leading edge surface 121, the trailing edge surface 122, the first side edge surface 123, and the second side edge surface 124. The first surface 152 is defined by a first perimeter 162, shown by a dashed line. The trailing-edge pad 180 also has a second surface 154 at a second level 144, the second level 144 being below the first level 142. The second surface 154 is substantially parallel to the first surface 152. The second surface 154 is defined by a second perimeter 164, shown by a dashed line, which is within the first perimeter 162. As used in this context, the word "within" means that the second perimeter 164 fits inside of the first perimeter 162 and does not intersect or touch the first perimeter 162. Thus, the area of the second surface 154 is smaller than and inside of the area of the first surface 152. The trailing-edge pad 180 also has a third surface 156 at a third level 146. The third level 146 is below the second level 144. The third surface 156 is substantially parallel to the first surface 152 and the second surface 154. The third surface 156 has a third perimeter 166 that is within the second perimeter 164 (which means that it is also within the first perimeter 162). Thus, the area of the third surface 156 is smaller than and inside of the area of the second surface 154, and it is also smaller than and inside of the area of the first surface 152.

As will be appreciated by a person having ordinary skill in the art, the meaning of the word "perimeter" as used herein may not comport with its ordinary meaning of "a continuous line forming the boundary of a closed geometric figure." As used herein, the word "perimeter" refers to the outer border of an area, which may or may not be a closed area. Depending on the area defined by the perimeter, the perimeter may or may not be a continuous line (or a continuous collection of line segments). For example, as explained below, the trailing edge pad 180 may be connected to first and second arms 172, 174. Thus, the perimeter 162 of the first surface 152 of the trailing edge pad 180 may be open (i.e., does not define a closed area), as shown in the close-up view of the trailing edge pad 180 in FIG. 7. Likewise, the perimeter 164 of the second surface 154 of the trailing edge pad 180 may be open, as shown in the close-up view of the trailing edge pad 180 in FIG. 7. Alternatively, a perimeter may define a closed area. For example, the perimeter 166 of the third surface 156 is closed, as shown in the close-up view of the trailing edge pad 180 in FIG. 7. Thus, depending on context, the meaning of the word "perimeter" as used herein may be broader than its ordinary meaning.

FIG. 8 illustrates the exemplary slider 525 of FIG. 7 with the ABS oriented upward. It is to be understood that when the slider 525 is installed in a disk drive 500, the ABS will be oriented downward, facing the disk 520. For ease of explanation, this document adopts the convention of illustrating and describing the slider 525 with the ABS facing upward, as shown in FIG. 8. With the slider 525 so oriented, the level 142 is illustrated and described as being "above" the levels 144, 146, and 148; the level 144 is illustrated and described as being "below" the level 142 and "above" the levels 146 and 148; the level 146 is illustrated and described as being "below" the levels 142 and 144 and "above" the level 148; and the level 148 is illustrated and described as being "below" the levels 142, 144, and 146. Of course, when the slider 525 is installed in a disk drive 500, the ABS will be oriented downward, toward the disk. Consequently, the level 142 will be the level closest to the disk 520, making it the lowest level, and levels 144, 146, and 148 will be progressively further away from the disk 520.

In some embodiments, the second level 144 is between approximately 100 nm and 200 nm below the first level 142, and the third level 146 is between approximately 300 nm and 2000 nm below the second level. For example, the second level 144 may be approximately 120 nm below the first level 142, and the third level 146 may be approximately 700-1000 nm below the second level 144.

As shown in FIGS. 7 and 8, a portion, but not necessarily all, of the third perimeter 166 may be parallel to (i.e., extends in the same direction, is everywhere equidistant, and does not meet) a portion of the second perimeter 164. In the exemplary embodiment of FIGS. 7 and 8, the long sides (i.e., the sides extending in the direction from the first side edge surface 123 to the second side edge surface 124) of the third perimeter 166 (the perimeter of the third surface 156) are parallel to a portion of the second perimeter 164 (the perimeter of the second surface 154) that extends in the direction from the first side edge surface 123 to the second side edge surface 124.

In some embodiments, the second perimeter 164 and/or the third perimeter 166 includes a protrusion. For example, in the exemplary embodiment illustrated in FIGS. 7 and 8, the second perimeter 164 (of the second surface 154) and the third perimeter 166 (of the third surface 156) both include arc-shaped protrusions in the direction toward the leading edge surface 121. The second perimeter 164 and/or the third perimeter 166 may include other protrusions in addition or alternatively (e.g., the protrusion could be a finger-type of protrusion such as shown in FIGS. 5 and 6 or any other suitably-shaped protrusion, or there may be more than one protrusion in the second perimeter 164 and/or the third perimeter 166).

In some embodiments, the length 168 of the third surface 156 in the direction from the first side edge surface 123 to the second side edge surface 124 is greater than the length 169 of the third surface 156 in the direction from the leading edge surface 121 to the trailing edge surface 122. In other words, the third surface 156 may be longer in the cross-track direction than it is in the down-track direction. For example, as shown in the exemplary embodiment of FIGS. 7 and 8, the length 168 of the third surface 156 in the direction from the first side edge surface 123 to the second side edge surface 124 may be at least twice the length 169 of the third surface 156 in the direction from the leading edge surface 121 to the trailing edge surface 122.

As illustrated in FIGS. 7 and 8, the slider 525 may also include first and second arms 172, 174 that connect to and extend from the trailing edge pad 180 toward the leading edge surface 121. The first and second arms 172, 174 may be separated by an etched cavity and have tapered or stepped leading edges. In some embodiments, the first and second arms 172, 174 form a channel through which air flows when the slider 525 flies over the disk 520. Additional stepped surfaces may also be formed at various other locations on the slider 525, as illustrated in FIGS. 7 and 8.

Figure 9A:
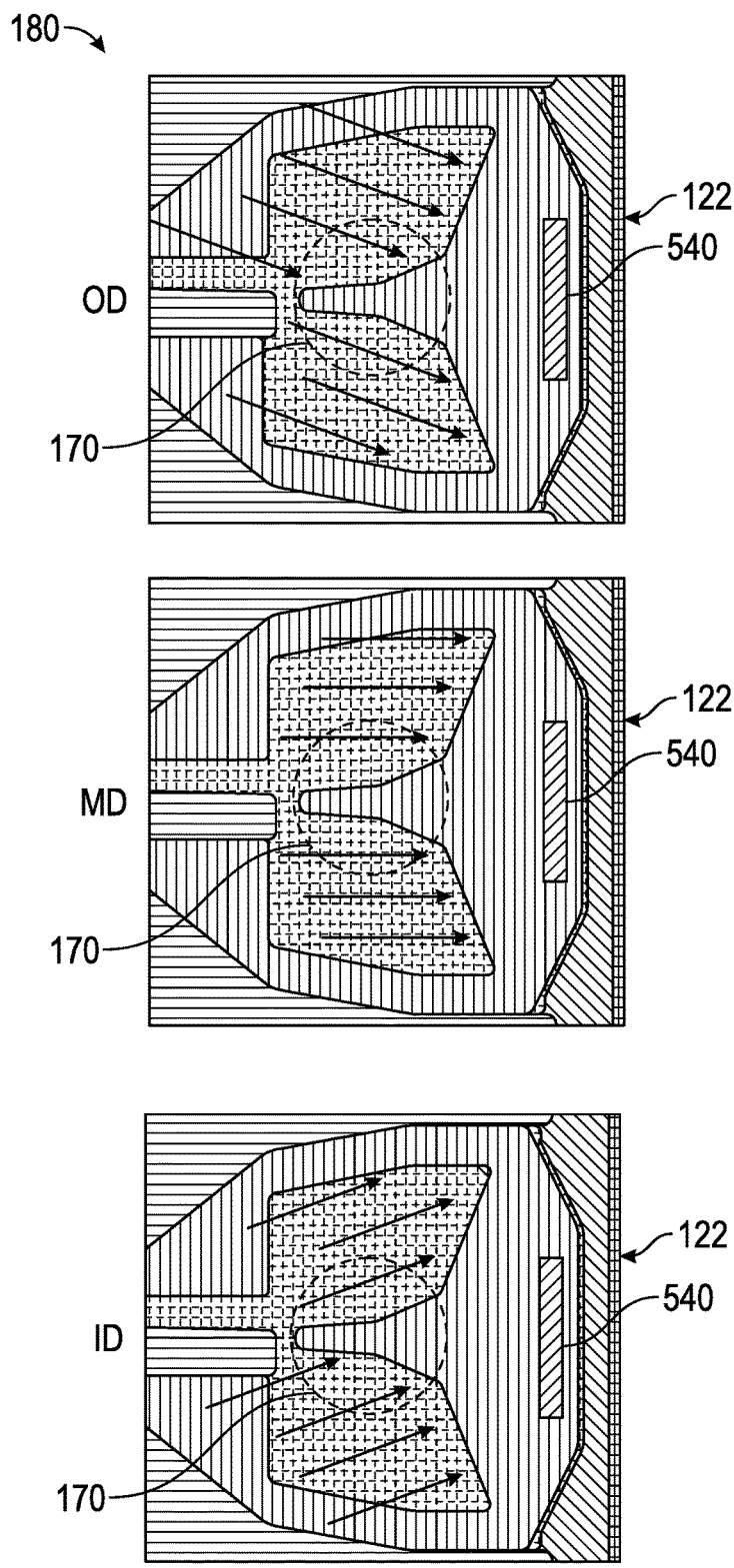
FIGS. 9A and 9B illustrate the difference in the flow across the air-bearing surface (ABS) a slider having a finger-type feature versus across the ABS of an exemplary slider having an EFH in accordance with some embodiments.
Figure 9B:
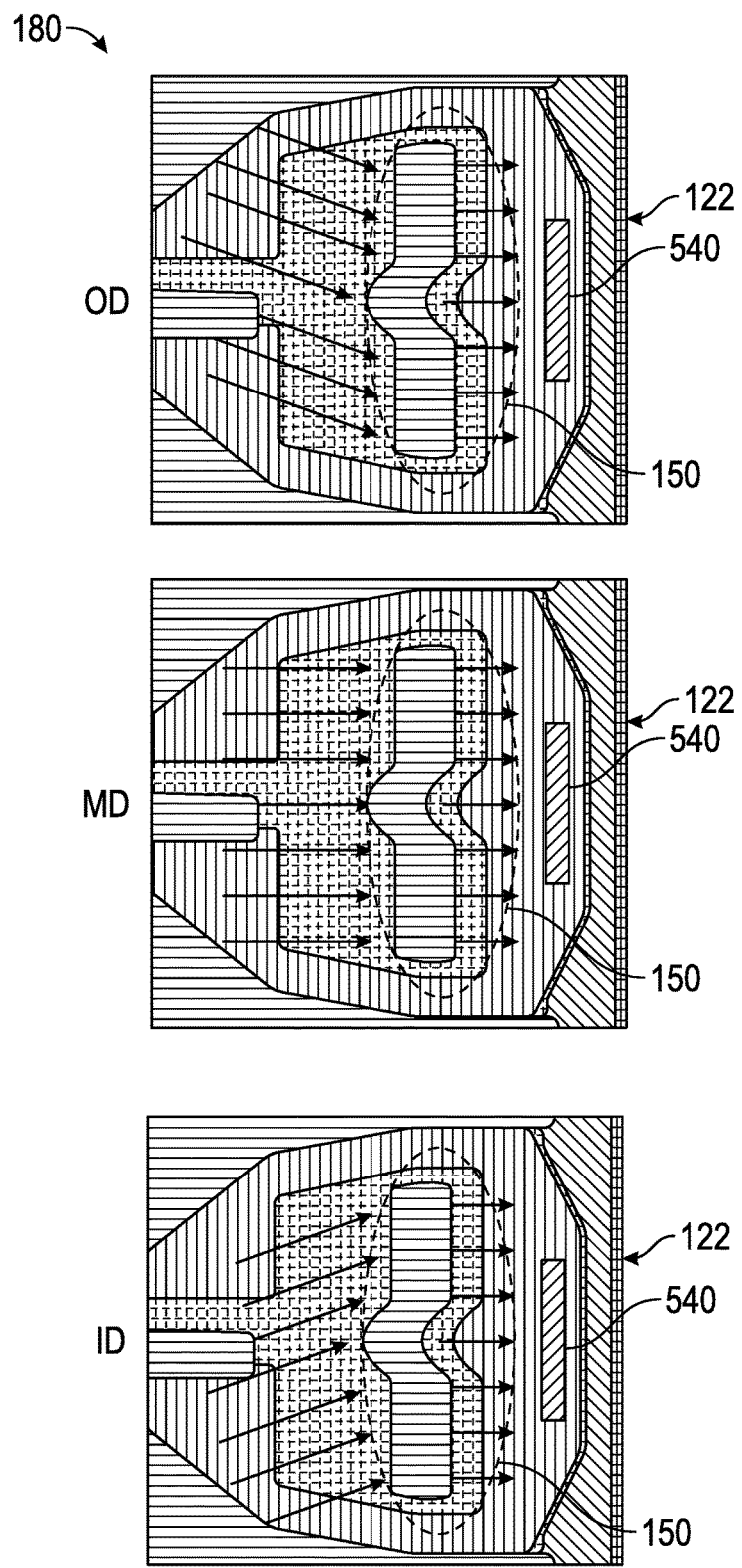

FIGS. 9A and 9B illustrate the difference in the flow of air using a slider 525 having a finger-type feature 170 (e.g., using a slider 525 such as the one shown in FIGS. 5 and 6) versus a slider 525 having the EFH 150 (e.g., using a slider such as the exemplary slider 525 shown in FIGS. 7 and 8). As shown in FIG. 9A, when the trailing edge pad 180 includes a finger-type feature 170, the direction of air flowing over the portion of the trailing edge pad 180 closer to the trailing edge surface 122 of the slider 525, which is where the magnetic head is situated, is dependent on where over the disk 520 the slider 525 flies. The air flow direction when the slider 525 flies over the MD is approximately in the down-track direction, whereas the air flow direction when the slider 525 flies over the ID or OD is at an angle relative to the down-track direction.

FIG. 9B illustrates how the EFH 150 provides a more consistent air flow direction and magnitude over the magnetic head 540 on the trailing edge pad 180, regardless of where over the disk 520 the slider 525 flies. The EFH 150 collects the incoming airflow and redirects it so that the amount and direction of the air flowing over the magnetic head 540 is approximately the same at ID and OD as at MD.

Figure 10:
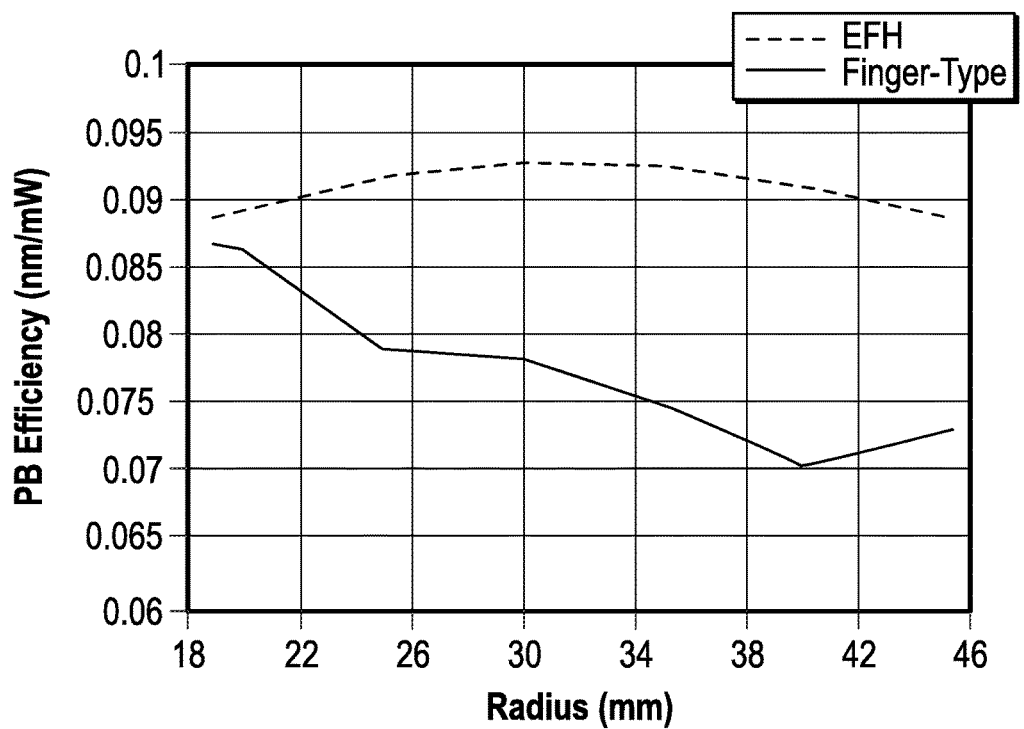
FIG. 10 provides a comparison of the pull-back (PB) efficiency of a slider having finger-type feature and an exemplary slider having an EFH in accordance with some embodiments.

FIG. 10 provides a comparison of the PB efficiency of a slider 525 having a finger-type feature 170 and an exemplary slider 525 having an EFH 150 in accordance with some embodiments. The PB efficiency of the slider 525 with a finger-type feature 170 is shown by the solid line, and the PB efficiency of the slider 525 with the EFH 150 is shown by the dashed line. The PB efficiency of the slider 525 with a finger-type feature 170 varies between a maximum of about 0.087 nm/mW (at ID) to a minimum of about 0.07 nm/mW (closer to OD), which is a variation of 0.016 nm/mW. Moreover, the difference between the maximum TDP and the minimum TDP was measured to be 28.3 mW. In contrast, the PB efficiency of the slider 525 with an EFH 150 is more consistent and varies only between about 0.089 nm/mW and 0.093 nm/mW, which is a difference of only 0.04 nm/mW, or about ¼ of the variation of the slider 525 with the finger-type feature 170. Similarly, the difference between the maximum TDP and the minimum TDP was measured to be only 1.6 mW for the slider 525 with an EFH 150.

Figure 11:
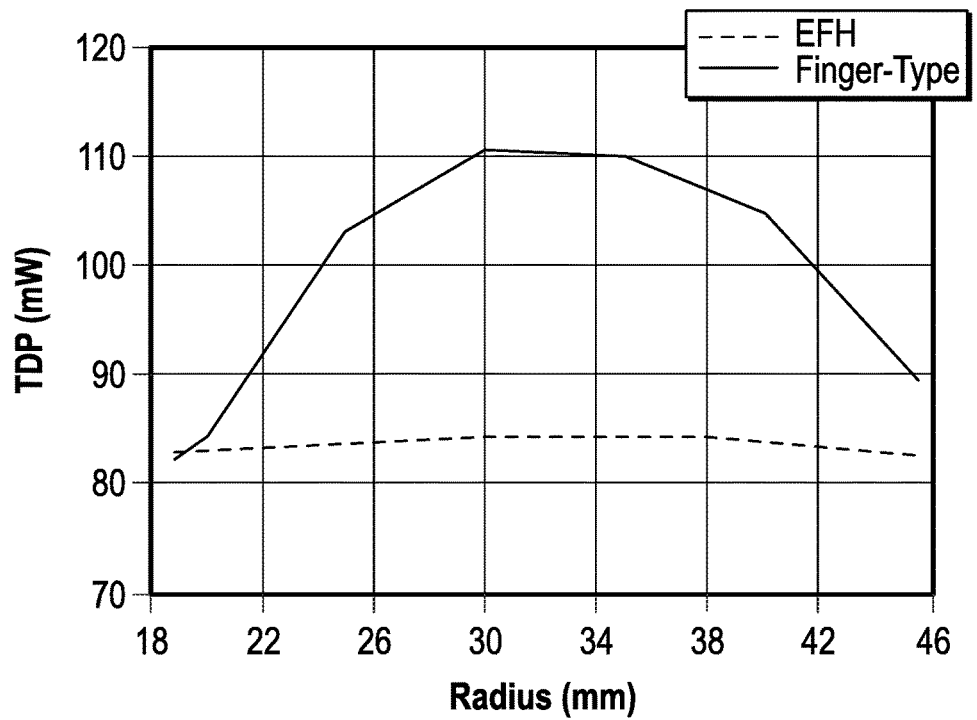
FIG. 11 plots the TDP profiles for a slider having finger-type feature and an exemplary slider having an EFH in accordance with some embodiments.

FIG. 11 plots the TDP profiles for a slider 525 having finger-type feature 170 (solid line) and an exemplary slider 525 having an EFH 150 (dashed line) in accordance with some embodiments. The TDP profile for the slider 525 with the finger-type feature 170 is the same as shown in FIG. 3. FIG. 11 shows that the EFH 150 results in a TDP profile that is almost flat across the disk radius. The EFH 150 provides an improvement in the TDP hump measured to be approximately 94%.

Figure 12A:
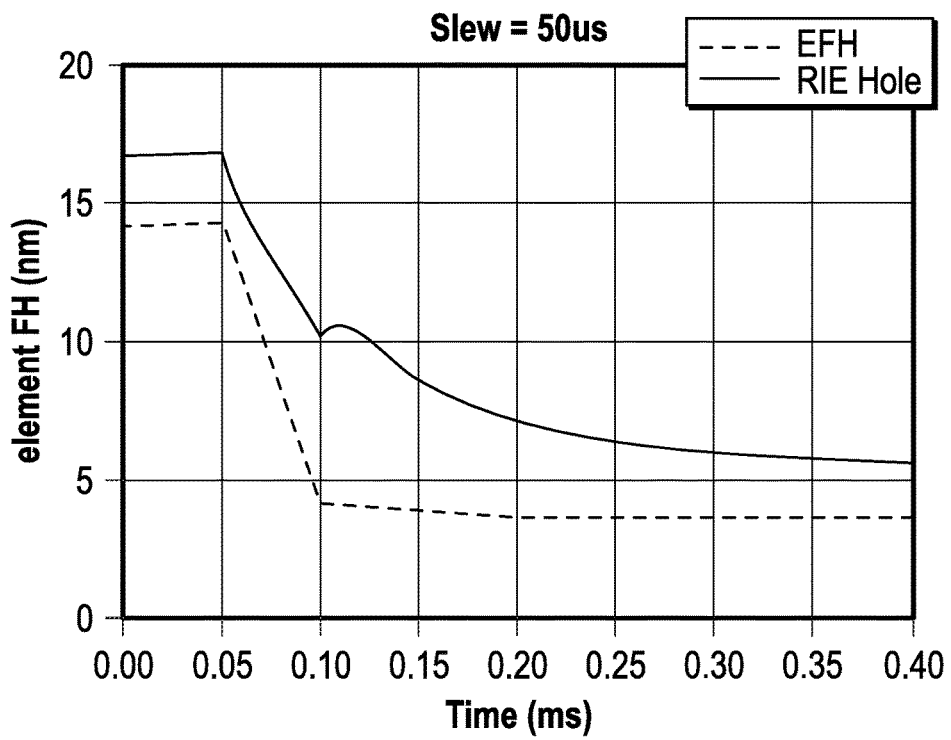
FIG. 12A plots the thermal fly-height control (TFC) time constant (re-coil effect) at mid-disk with a slew of 50 μs for a slider having a reactive ion etching (RIE) hole and an exemplary slider having an EFH in accordance with some embodiments.
Figure 12B:
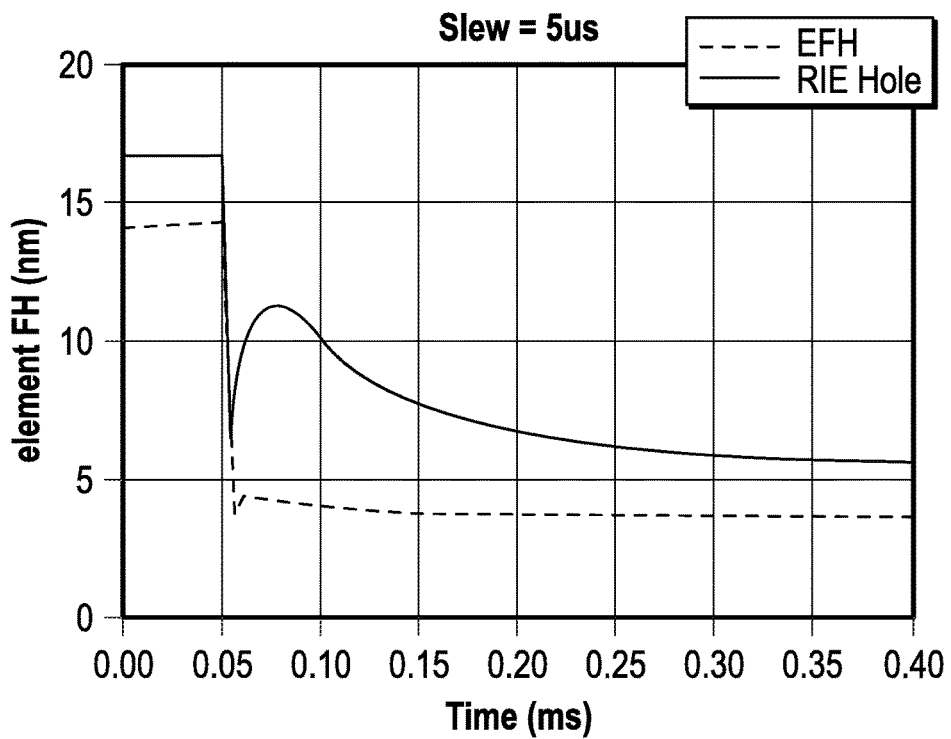
FIG. 12B plots the TFC time constant (re-coil effect) at mid-disk with a slew of 5 μs for a slider having a RIE hole and an exemplary slider having an EFH in accordance with some embodiments.

FIG. 12A plots the TFC time constant (re-coil effect) at MD with a slew of 50 μs for a slider 525 having a deep recess 160 (also referred to as a RIE hole, shown by the solid line) and an exemplary slider 525 having an EFH 150 (dashed line) in accordance with some embodiments. As shown in FIG. 12A, the slider 525 with the EFH 150 exhibits no significant re-coil effect, whereas the slider 525 with the deep recess 160 exhibits re-coil at approximately 0.1 ms. FIG. 12B plots the TFC time constant (re-coil effect) at MD with a shorter slew of 5 μs for the same two exemplary sliders 525 (again, with the solid line illustrating the performance of the slider 525 with a deep recess 160 and the dashed line illustrating the performance of the slider 525 with the EFH 150). The differences in re-coil between the slider 525 with a deep recess 160 and the slider 525 with an EFH 150 are substantial when the slew is shorter. The slider 525 with the deep recess 160 exhibits a strong re-coil effect at 0.05 ms, whereas the slider 525 with the EFH 150 exhibits a much smaller re-coil effect.

Figure 13:
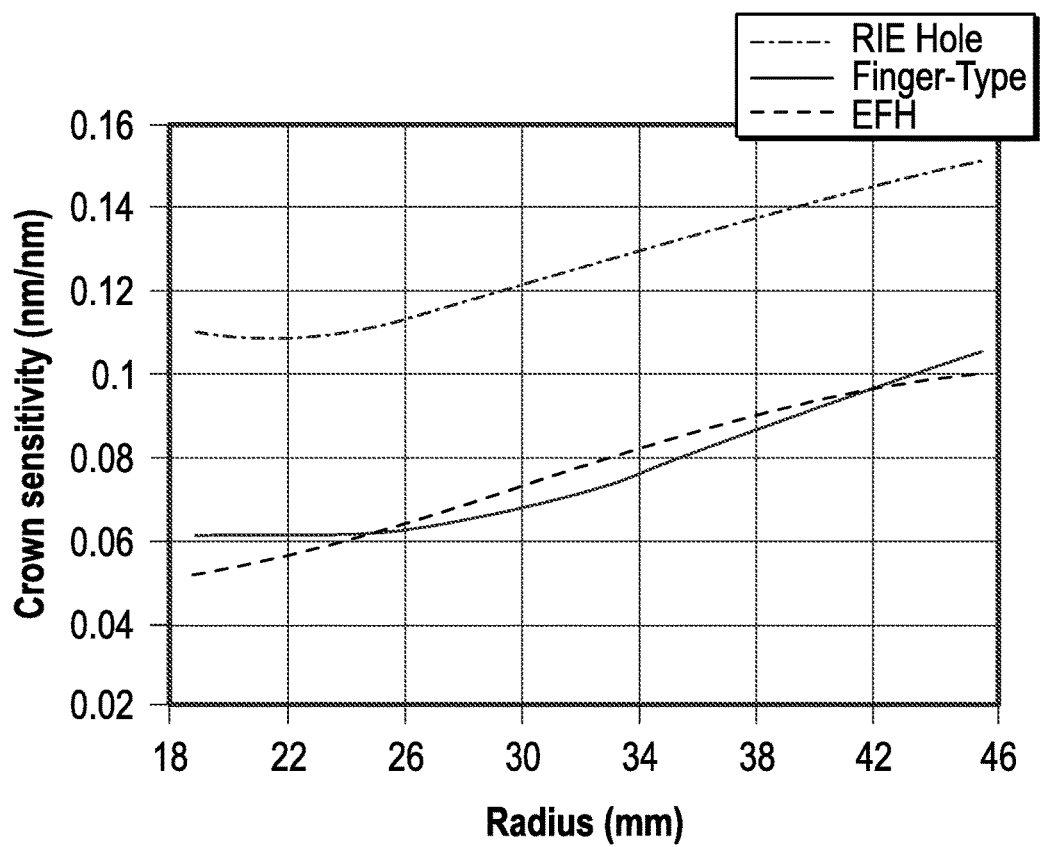
FIG. 13 plots the crown sensitivities of a slider having a RIE hole and an exemplary slider having an EFH in accordance with some embodiments.

FIG. 13 plots the crown sensitivities of a slider 525 having a deep recess 160 (dash-dot line), a slider 525 having a finger-type feature 170 (solid line), and an exemplary slider 525 having an EFH 150 (dashed line) in accordance with some embodiments. As illustrated by FIG. 13, the slider 525 with a deep recess 160 has high crown sensitivity that varies from a low of about 0.11 nm/nm near ID to a high of about 0.15 nm/nm near OD. In contrast, both the slider 525 with a finger-type feature 170 and the slider 525 with an EFH 150 have lower crown sensitivities. For example, the crown sensitivity of the slider 525 with the EFH 150 varies from a low of about 0.05 nm/nm at ID to a high of about 0.1 nm/nm at OD. Thus, the peak crown sensitivity of the slider 525 with the EFH 150 is less than the minimum crown sensitivity of the slider 525 with the deep recess 160, and it is similar to the crown sensitivity of the slider 525 with the finger-type feature 170.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

As set forth herein, as used to describe the relative positions of different layers of a slider ABS, the terms "above," "below," "higher," and "lower" are used assuming that the ABS of the slider is facing up.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A slider, comprising:
    a leading edge surface;
    a trailing edge surface opposite the leading edge surface;
    a first side edge surface extending between the leading edge surface and the trailing edge surface;
    a second side edge surface opposite the first side edge surface and extending between the leading edge surface and the trailing edge surface; and
    a trailing edge pad comprising:
        a first surface at a first level, the first surface being substantially perpendicular to the leading edge surface, the trailing edge surface, the first side edge surface, and the second side edge surface, the first surface having a first perimeter,
        a second surface at a second level, the second level being below the first level, the second surface being substantially parallel to the first surface, the second surface having a second perimeter, wherein the second perimeter is within the first perimeter, and
        a third surface at a third level, the third level being below the second level, the third surface being substantially parallel to the first and second surfaces, the third surface having a third perimeter, wherein the third perimeter is within the second perimeter.

2. The slider recited in claim 1, wherein the second level is between approximately 100 nm and 200 nm below the first level, and the third level is between approximately 300 nm and 2000 nm below the second level.

3. The slider recited in claim 1, wherein a portion of the third perimeter is parallel to a portion of the second perimeter.

4. The slider recited in claim 1, wherein the second perimeter and the third perimeter include a protrusion.

5. The slider recited in claim 1, further comprising first and second arms connected to and extending from the trailing edge pad toward the leading edge surface, the first and second arms forming a channel.

6. The slider recited in claim 1, wherein the second perimeter or the third perimeter includes a protrusion.

7. The slider recited in claim 6, wherein the protrusion is in a direction toward the leading edge surface.

8. The slider recited in claim 6, wherein the protrusion is an arc.

9. The slider recited in claim 8, wherein the second level is between approximately 100 nm and 200 nm below the first level, and the third level is between approximately 300 nm and 2000 nm below the second level.

10. The slider recited in claim 6, wherein the protrusion is a finger-type feature.

11. The slider recited in claim 1, wherein a length of the third surface in a direction from the first side edge surface to the second side edge surface is greater than a length of the third surface in a direction from the leading edge surface to the trailing edge surface.

12. The slider recited in claim 11, wherein the length of the third surface in the direction from the first side edge surface to the second side edge surface is at least twice the length of the third surface in the direction from the leading edge surface to the trailing edge surface.

13. The slider recited in claim 11, wherein the second perimeter or the third perimeter includes a protrusion.

14. The slider recited in claim 13, wherein the protrusion is in a direction toward the leading edge surface.

15. The slider recited in claim 13, wherein the protrusion is an arc or a finger-type feature.

16. The slider recited in claim 11, wherein the second level is between approximately 100 nm and 200 nm below the first level, and the third level is between approximately 300 nm and 2000 nm below the second level.

17. A hard disk drive comprising the slider recited in claim 11.

18. The slider recited in claim 1, wherein the trailing edge pad further comprises a read and write head.

19. A hard disk drive comprising the slider recited in claim 18.

20. A hard disk drive comprising the slider recited in claim 1.

* * * * *